United States Patent [19]

White

[11] Patent Number: 5,360,301

[45] Date of Patent: Nov. 1, 1994

[54] TAPERED CUTTER MOUNTING

[76] Inventor: Joseph P. White, 28655 Kimberly, St. Clair Shores, Mich. 48081

[21] Appl. No.: 29,829

[22] Filed: Mar. 11, 1993

[51] Int. Cl.$^5$ ............................................. B23B 31/10
[52] U.S. Cl. ....................................... 409/234; 279/8
[58] Field of Search ................ 409/232, 234; 408/231, 408/232, 233; 279/8

[56] References Cited

U.S. PATENT DOCUMENTS

| 1,337,313 | 4/1920 | Groene | 409/234 |
| 2,995,963 | 8/1961 | Lavallee | 408/233 |
| 4,393,626 | 7/1983 | Shroer | 409/234 |
| 5,090,851 | 2/1992 | White | 409/201 |

FOREIGN PATENT DOCUMENTS

| 140014 | 2/1980 | Germany | 409/234 |
| 31577 | 3/1980 | Japan | 409/234 |
| 144922 | 11/1980 | Japan | 409/232 |
| 241011 | 10/1986 | Japan | 409/234 |
| 190614 | 8/1991 | Japan | 409/234 |
| 268869 | 7/1970 | U.S.S.R. | |
| 544517 | 2/1974 | U.S.S.R. | |
| 645533 | 1/1979 | U.S.S.R. | |

OTHER PUBLICATIONS

GTE Valenite—Rotary Toolings Systems Catalog, Aug. of 1991 pp. 25 and 31.

Primary Examiner—Daniel W. Howell
Attorney, Agent, or Firm—Peter D. Keefe

[57] ABSTRACT

A tapered mounting for cutters which automatically provides accurate positioning of a cutter with respect to a holder. More particularly, the tapered mounting provides a concentric and perpendicular mounting of the cutter with respect to a centerline of rotation of the holder. The tapered cutter mounting in part provided by a frustoconically shaped shank, which is provided with one or more keys. The tapered mounting is further in part provided by a conically shaped bore in the cutter, the conically shaped bore having keyways for accepting the keys. The conically shaped bore surface is dimensioned to firmly engage the frustoconically shaped shank surface so that the cutter is precisely aligned concentrically and perpendicularly with respect to the centerline of rotation of the holder. The cutter hub is held fast with respect to the holder by operation of a hold down screw or bolt which threadably engages with respect to the holder.

9 Claims, 1 Drawing Sheet

TAPERED CUTTER MOUNTING

BACKGROUND OF THE INVENTION

1. Field of the Invention

The present invention relates to mounting structures for cutters, and more particularly to a tapered mounting structure for mounting a cutter onto a rotatably driven holder.

2. Description of the Prior Art

Cutters (also sometimes referred to as "side cutters") used in the machine tool industry have a circular cross-section, the outer periphery of which being provided with cutting teeth of a predetermined structure. In order for the cutter to rotate so that the cutting teeth engage rotatably with a workpiece, the cutter is provided with a center bore for receiving a shank of a holder. In this regard, the holder is mounted on machinery for providing rotation of the holder about the centerline of the shank.

The state of the art practice for mounting cutters is depicted in FIG. 1. A holder 10 in the form of a shell mill adapter is provided, which would connect to some conventional rotary motion generating machine. The holder 10 includes a holder hub 12 defined at one end by a shoulder 14. A shank 16 projects from the shoulder 14, and includes an axially disposed threaded bore 18. A cutter 20 includes a center bore 22 which has been slipped onto the shank 16. A pair of keys 24 are provided on opposite sides of the shoulder 14, and which are partly resident in slots 26. The cutter hub 28 includes slots 30 for partly receiving the keys 24. A hold-down screw 32 having a head 32a threadably engages with the threaded bore 18 until the cutter 20 is firmly held between the shoulder 14 and the head 32a.

While the mounting structure indicated in FIG. 1 provides a reasonably good mounting for the cutter, there are several severe disadvantages present.

One problem has to do with concentricity. Any tolerance between the inside diameter of the center bore 22 and the outside diameter of the shank 16 will almost certainly result in an asymmetric mounting of the cutter with respect to the centerline C of the shank. Consequently, the periphery of the cutter 20, which is circular, will not concentrically rotate about the centerline C. This untoward situation will result in uneven tooth engagement at the workpiece. As an example, consider a machining operation having a 0.002 inch cut (chip load) per cutting tooth. If the centering of the center bore 22 on the shank 16 is off by 0.002 inch, intermittent tooth engagement with the workpiece can occur, resulting in not only uneven tooth wear, but rough surface finish on the workpiece. This effect is magnified for cutters of increasing diameter. And, this problem cannot be conventionally eliminated because some tolerance is inevitably needed in order to slip the center bore 22 onto the shank 16.

Another problem has to do with perpendicularity. The tolerance between the center bore 22 and the shank 16 permits the cutter to be mounted in a non-perpendicular relation to the centerline C. While the shoulder 14 and the head 32a may mutually serve to align the cutter 20, a small variation in alignment between the head, the shoulder and the cutter hub 28 will result in a non-perpendicular alignment of the cutter with respect to the centerline C. As the cutter then rotates, the periphery thereof will not track true, and the teeth will wander on the workpiece over a wider area than that intended.

These problems are exacerbated by periodic removal and replacement of cutters on the holder, in which a repeat of exact alignment is dubious.

Accordingly, what is needed is a mounting structure of cutters which solves the foregoing problems.

SUMMARY OF THE INVENTION

The present invention is a tapered mounting for cutters which automatically provides accurate positioning of a cutter with respect to a holder. More particularly, the tapered mounting provides a concentric and perpendicular mounting of the cutter with respect to a centerline of rotation of the holder.

The tapered cutter mounting according to the present invention is in part provided by a frustoconically shaped shank, which is provided with one or more keys. The tapered mounting is further in part provided by a conically shaped bore in the cutter, the conically shaped bore having keyways for accepting the keys. The conically shaped bore surface is dimensioned to firmly engage the frustoconically shaped shank surface so that the cutter is precisely aligned concentrically and perpendicularly with respect to the centerline of rotation of the holder. The cutter hub is held fast with respect to the holder by operation of a hold down screw or bolt which threadably engages with respect to the holder.

Accordingly, it is an object of the present invention to provide a tapered mounting structure for mounting cutters to holders in which the cutter is accurately aligned in terms of concentricity and perpendicularity with respect to the centerline of rotation of the holder.

It is another object of the present invention to provide a tapered mounting structure for accurately mounting a cutter to a holder, wherein the holder is provided with a frustoconical shank and the cutter is provided with a conical bore, the mutual abutment between the surface of the frustoconical shank and the surface of the conical bore providing accurate alignment of the cutter to the centerline of rotation of the holder.

These, and additional objects, advantages, features and benefits of the present invention will become apparent from the following specification.

DETAILED DESCRIPTION OF THE PREFERRED EMBODIMENT

Figure 1:
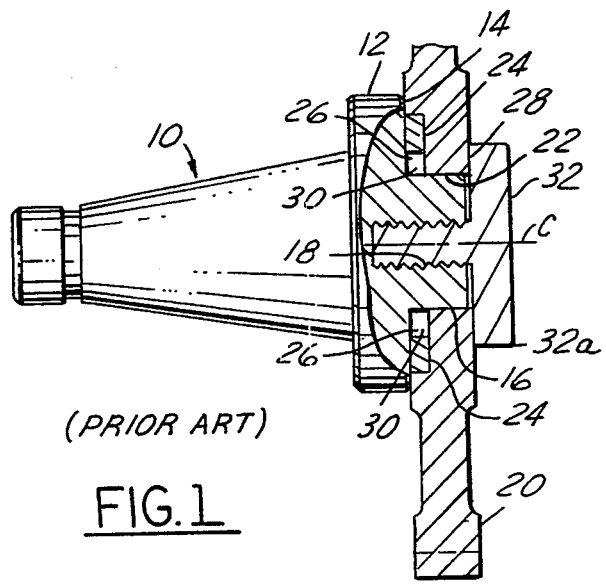
FIG. 1 is a partly sectional side view of a prior art mounting structure for mounting a cutter onto a holder.
Figure 2:
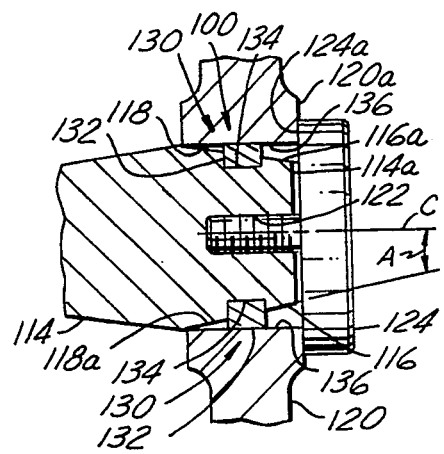
FIG. 2 is a partly sectional side view of a tapered mounting structure according to the present invention for mounting a cutter onto a holder, a hold down screw being provided.
Figure 3:
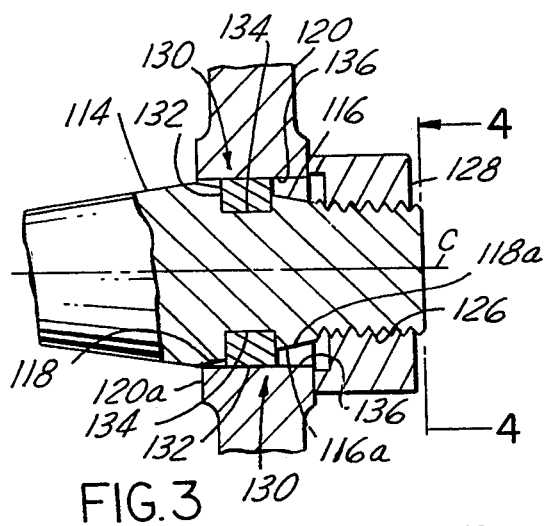
FIG. 3 is a partly sectional side view of a tapered mounting structure according to the present invention for mounting a cutter onto a holder, a hold down bolt being provided.

Referring now to the Drawing, FIGS. 2 and 3 generally show the tapered mounting structure 100 for mounting a cutter (or side cutter) 120 onto a holder 114.

The holder 114, is connected to a conventional machine for providing rotary motion of the holder about a centerline C. The tapered mounting structure 100 is composed of a frustoconically shaped, or frustoconical, portion 116 of the holder 114 and a conically shaped, or conical, bore 118 of the cutter 120. The cutter 120 is of circular cross-section and is provided in a conventional manner with a plurality of teeth of predetermined structure on its outer periphery (not shown) for engaging with a workpiece. The conical bore 118 is located centrally with respect to the periphery of the cutter 120. The frustoconical portion 116 of the holder 114 may or may not be located at or adjacent an end of the holder 114, as shown in FIGS. 2 and 3.

Now, with greater specificity, the structure and function of the tapered mounting structure 100 will be detailed with reference being had additionally to the remaining Figures.

The frustoconical portion 116 of the holder 114 extends axially with respect to the centerline C for a length substantially equal to the thickness of the hub 120a of the cutter 120. The taper angle A (see FIG. 2) of the surface 116a of the frustoconical portion 116 with respect to the centerline C is preferred to be in the range of eight to ten degrees, although the taper angle may optionally be another angle.

The surface 118a of the conical bore 118 is reciprocally shaped with respect to the surface 116a of the frustoconical portion 116, having the taper angle A. Further, the surface 116a of the frustoconical portion 116 and the surface 118a of the conical bore 118 are dimensioned so that when the frustoconical portion 116 is seatably received by the conical bore 118, the surface 116a of the frustoconical portion 116 tightly abuts the surface 118a of the conical bore 118 to thereby define a precise location of the cutter 120 relative to the holder 114 and further to thereby provide a precise alignment of the cutter in terms of both concentricity and perpendicularity with respect to the centerline C.

The conical bore 118 of the cutter 120 is held in tight abutting relation to the frustoconical portion 116 of the holder by a retaining means effected by any suitable mechanical structure. For example, FIG. 2 depicts a threaded axial bore 122 into which is threaded a hold down screw 124. The hold down screw 124 is provided with a head 124a which abuts the hub 120a of the cutter 120 and causes the conical bore 118 to seat with respect to the frustoconical portion 116 as the hold down screw is threaded into the threaded bore. Further for example, FIG. 3 depicts a threaded shank 126 projecting axially from the frustoconical portion 116. A hold down nut 128 is threadably received on the threaded shank 126. The hold down nut 128 abuts the hub 120a of the cutter 120 and causes the conical bore 118 to seat with respect to the frustoconical portion 116 as the hold down nut is threaded onto the threaded shank.

Common to each depiction in FIGS. 2 and 3, a threaded structure on the holder 114 and a removable threaded fastener is provided. As the threaded fastener threads with respect to the threaded structure, the threaded fastener abuts the cutter so as to cause the frustoconical portion 116 to be seatably received by the conical bore 118. Of course, other structures are usable, such as for example that depicted in FIG. 5, which is discussed hereinbelow.

Figure 5:
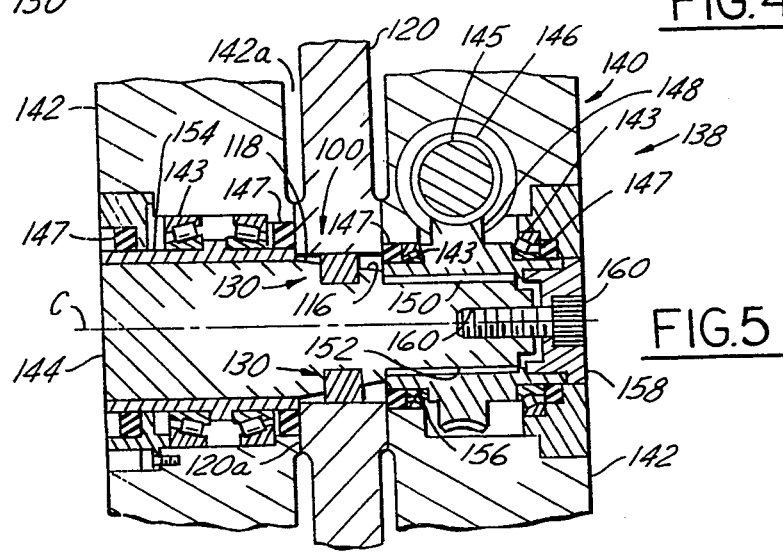
FIG. 5 is a partly sectional side view of the tapered mounting structure, shown in operation with respect to a cutting tool for a milling machine.

Further, in each depiction in FIGS. 2, 3 and 5, there is provided sufficient threadable engagement between the threaded structure and the threaded fastener to ensure that sufficient axial force parallel with the centerline C is applied to the cutter 120, without interference occurring with respect to any other structure. As a result, tight seating of the frustoconical surface 116 with respect to the conical bore 118 is assured. In this regard, FIG. 2 depicts a gap provided between the end 114a of the holder 114 and the head 124a; FIG. 3 depicts an annular engagement ring 128a connected integrally with the hold down nut 128; and FIG. 5 (see description hereinbelow) depicts a gap between the cutter shaft 144 and the hold down adapter 158.

Figure 4:
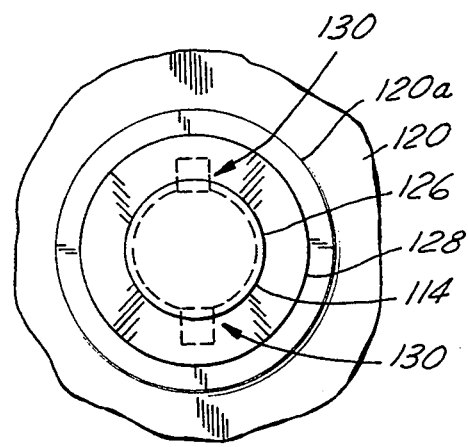
FIG. 4 is an end view of the tapered mounting structure, scene along lines 4—4 in FIG. 3.

In order that the cutter 120 rotate with the holder 114, a drive transfer mechanism therebetween is provided. A preferred drive transfer mechanism is in the form of at least one key-keyslot and keyway combination 130. In this regard, FIGS. 2, 3 and 4 depict two symmetrically spaced key-keyslot and keyway combinations 130. Each key-keyslot and keyway combination 130 is defined by a key 132 partly located in a keyslot 134 in the frustoconical surface 116a and by an axial keyway 136 provided in the conical surface 118a for receiving the exposed portion of the key 132. Axial alignment of the keyway 136 permits the cutter 120 to be axially slid off from and onto the holder 114, yet the cutter will be restrained to rotate with the holder when seated thereupon as described hereinabove. Of course, it is possible to reverse the placements of the keyslot 134 and keyway 136 with respect to the frustoconical portion 116 and the conical bore 118.

An example of the tapered mounting structure 100 in operation is depicted in FIG. 5. Here, a cutting tool for a milling machine 138 is utilized of the type (with exception of modification by the taper mounting structure 100) described in U.S. Pat. No. 5,090,851 to White, dated Feb. 25, 1992, which is hereby incorporated by reference.

It will be discerned from FIG. 5, that the cutting tool for a milling machine 138 includes a cutter head 140 connected to a quill (not shown). The cutter head 140 is defined by a cutter head body 142. The cutter body forms a slot 142a. A cutter shaft 144 is rotatably mounted by bearings 143 and seals 147 to the cutter head body 142. A cutter head drive shaft 145 is rotatably powered and rotation thereof is transmitted to the cutter shaft 144 via meshing of a worm 146 with a worm gear 148. The worm gear 148 is connected to the cutter shaft 144 via splines 150.

The aforesaid cutter 120 is provided with the aforesaid conical bore 118 and the aforesaid cutter hub 120a (although the cutter hub is not a requirement). The cutter shaft 144 is provided with a reduced diameter portion 152 adjacent the splines 150. The cutter shaft 144 is further provided with the aforesaid frustoconical portion 116 immediately adjoining the reduced diameter portion 152. Both the conical bore 118 and the frustoconical portion 116 are provided with at least two symmetrically spaced aforesaid key-keyslot and keyway combinations 130.

The conical bore 118 of the cutter 120 is slipped onto the cutter shaft 144 from the reduced diameter portion 152 and placed abutably onto the frustoconical portion 116. A hub 154 is slid over a portion of the cutter shaft 144 in splined relationship thereto, and is affixed so as to not be axially movable. The worm gear 148 is provided with a sleeve 156, a first end of which abuts the cutter hub 120a. A hold down adapter 158 abuts the second end of the sleeve 156. A hold down screw 160 is threadably engaged with a threaded bore 162 in the cutter shaft 144. As the hold down screw 160 is threaded into the threaded bore 162, the sleeve 156 presses the cutter 120 into a precise location on the cutter shaft 144 which is in precise alignment both concentrically and perpendicularly with respect to the centerline C. In this regard, the hub 154 would not serve to determine the final position of the cutter 120 relative to the cutter shaft 144.

It is to be understood that the tapered mounting structure 100 may be used with wide range of rotary powered cutters, inclusive of circular saws. It is to be further understood that while a drive transfer mechanism in the form of at least one key-keyslot and keyway combination has been depicted herein by way of preferred example, other drive transfer mechanisms known in the art can be used as well, such as splines on the abutting conical and frustoconical surfaces.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A tapered mounting structure for mounting a cutter to a holder, the holder being rotatable about a centerline, said tapered mounting structure comprising:

a holder having a frustoconical portion, said frustoconical portion having a predetermined taper angle relative to said centerline, said frustoconical portion having a first surface;

a cutter having a centrally disposed conical bore, said conical bore being reciprocally shaped with respect to said frustoconical portion, said conical bore having substantially said predetermined taper angle, said conical bore having a second surface;

drive transfer means for transferring rotation of said holder to said cutter when said frustoconical portion is seatably received by said conical bore; and retaining means for selectively retaining said frustoconical portion seatably received by said cutter bore;

wherein said first surface of said frustoconical portion and said second surface of said conical bore are each dimensioned so that when said frustoconical portion is seatably received by said conical bore, said frustoconical portion tightly abuts said conical bore in a precisely defined placement with respect to said holder;

wherein said cutter has a predetermined thickness adjacent said conical bore, said frustoconical portion extending axially with respect to said centerline substantially equal to said predetermined thickness;

wherein said drive transfer means comprises at least one key-keyslot and keyway combination located partly in said frustoconical portion and partly in said conical bore;

wherein said retaining means comprises:

said holder being provided with a threaded structure; and a threaded fastener removably threaded on said threaded structure;

wherein as said threaded fastener threads with respect to said threaded structure, said threaded fastener abuts said cutter so as to cause said frustoconical portion to be seatably received by said conical bore;

wherein said taper angle is substantially between 8 and 10 degrees; and wherein said cutter is provided with a cutter hub adjacent said conical bore, said cutter hub having said predetermined thickness.

2. A cutter head for being connected with a forward end of a quill of a milling machine, the quill having a cylindrical axis, the milling machine including a spindle drive for rotating a connected spindle that is oriented parallel with respect to the cylindrical axis of the quill, said cutter head comprising:

a cutter head body, said cutter head body having a rear end connected with said forward end of said quill, said cutter head body having a forward end, said forward end of said cutter head body having a slot, said slot having an orientation parallel with respect to the cylindrical axis of the quill, a first portion of said forward end of said cutter head body being located on one side of said slot, a second portion of said forward end of said cutter head body being located on the other side of said slot;

a cutter shaft rotatably mounted to each of said first and second portions of said forward end of said cutter head body, said cutter shaft being oriented transversely with respect to said slot and the cylindrical axis of the quill, said cutter shaft rotating about a centerline;

a cutter mounted to said cutter shaft, said cutter rotating with said cutter shaft in said slot, said cutter having a periphery extending beyond said forward end of said cutter head body, said cutter being provided with a plurality of teeth on said periphery thereof;

cutter shaft drive shaft gearing means for drivably connecting said cutter shaft to the spindle connected with the spindle drive of the milling machine; and tapered mounting means for mounting said cutter to said cutter shaft, comprising:

a frustoconical portion of said cutter shaft, said frustoconical portion having a predetermined taper angle relative to said centerline, said frustoconical portion having a first surface;

said cutter having a centrally disposed conical bore, said conical bore being reciprocally shaped with respect to said frustoconical portion, said conical bore having substantially said predetermined taper angle, said conical bore having a second surface;

drive transfer means for transferring rotation of said cutter shaft to said cutter when said frustoconical portion is seatably received by said conical bore; and retaining means for selectively retaining said frustoconical portion seatably received by said cutter bore;

wherein said first surface of said frustoconical portion and said second surface of said conical bore are each dimensioned so that when said frustoconical portion is seatably received by said conical bore, said frustoconical portion tightly abuts said conical bore in a precisely defined placement with respect to said cutter shaft.

3. The tapered mounting structure of claim 2, wherein said taper angle exceeds 5 degrees.

4. The tapered mounting structure of claim 3, wherein said taper angle is substantially between 8 and 10 degrees.

5. The tapered mounting structure of claim 2, wherein said cutter has a predetermined thickness adjacent said conical bore, said frustoconical portion extending axially with respect to said centerline substantially equal to said predetermined thickness.

6. The tapered mounting structure of claim 5, wherein said drive transfer means comprises at least one key-keyslot and keyway combination located partly in said frustoconical portion and partly in said conical bore.

7. The tapered mounting structure of claim 6, wherein said retaining means comprises:
   a sleeve mounted on said cutter shaft, said sleeve having a first end and a second end, said first end of said sleeve abutting said cutter;
   a hold down adapter abutting said second end of said sleeve;
   said cutter shaft being provided with a threaded structure; and
   a threaded fastener removably threaded on said threaded structure, said threaded fastener abutting said hold down adapter;
   wherein as said threaded fastener threads with respect to said threaded structure, said threaded fastener abuts said hold down adapter so as to cause said frustoconical portion to be seatably received by said conical bore.

8. The tapered mounting structure of claim 7, wherein said taper angle is substantially between 8 and 10 degrees.

9. The tapered mounting structure of claim 8, wherein said cutter is provided with a cutter hub adjacent said conical bore, said cutter hub having said predetermined thickness.

* * * * *